(12) United States Patent
Newman et al.

(10) Patent No.: US 10,834,251 B2
(45) Date of Patent: *Nov. 10, 2020

(54) SYSTEM AND METHOD DETECTING FRAUD USING MACHINE-LEARNING AND RECORDED VOICE CLIPS

(71) Applicant: Capital One Services, LLC, McLean, VA (US)

(72) Inventors: Kaitlin Newman, Washington, DC (US); Jeffrey Rule, Chevy Chase, MD (US); Rajko Ilincic, Annandale, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/653,886

(22) Filed: Oct. 15, 2019

(65) Prior Publication Data

US 2020/0128126 A1 Apr. 23, 2020

Related U.S. Application Data

(63) Continuation of application No. 16/167,710, filed on Oct. 23, 2018, now Pat. No. 10,484,532.

(51) Int. Cl.
*H04M 3/22* (2006.01)
*H04M 3/51* (2006.01)
*H04M 3/436* (2006.01)
*G06N 20/00* (2019.01)

(52) U.S. Cl.
CPC .......... *H04M 3/2281* (2013.01); *G06N 20/00* (2019.01); *H04M 3/436* (2013.01); *H04M 3/5183* (2013.01); *H04M 2201/40* (2013.01)

(58) Field of Classification Search
CPC ....... G06N 20/00; G06F 15/16; G06F 16/258; G06F 40/30; G06F 40/194; G10L 21/00; G10L 17/005; G10L 25/90; H04M 2201/40; H04M 3/2281; H04M 3/436; H04M 3/5183; H04M 1/57; H04M 3/2218; H04M 3/42068; H04M 3/42221; H04M 3/5232; H04M 3/527; H04M 15/47; G07C 5/0816; H04L 63/0861; H04L 63/14; H04Q 3/0083; H04W 4/16
USPC ............ 370/217, 352; 379/13, 32.01, 88.01, 379/93.04, 111; 455/410, 404.1, 405; 705/50, 38, 44; 707/776; 709/223; 706/50; 726/22, 23
See application file for complete search history.

(56) References Cited

U.S. PATENT DOCUMENTS

| | | | | |
|---|---|---|---|---|
| 5,495,521 A | * | 2/1996 | Rangachar | H04Q 3/0016 379/93.04 |
| 5,627,886 A | * | 5/1997 | Bowman | H04M 3/36 379/111 |
| 5,659,593 A | * | 8/1997 | Tzvieli | H04M 3/22 370/244 |

(Continued)

*Primary Examiner* — Gerald Gauthier

(57) ABSTRACT

A system and method are disclosed for training a machine-learning model to detect characteristics of fraudulent calls. The machine-learning model is trained using audio clips, voice recognition, call handler feedback and general public knowledge of commercial risks to detect and divert fraudulent calls, thereby alleviating the burdens otherwise placed on call center service representatives.

20 Claims, 6 Drawing Sheets

(56) References Cited

U.S. PATENT DOCUMENTS

| | | | | |
|---|---|---|---|---|
| 5,732,128 | A * | 3/1998 | Bushnell | H04M 15/00 379/116 |
| 6,163,604 | A * | 12/2000 | Baulier | H04M 3/36 379/189 |
| 6,590,967 | B1 * | 7/2003 | Marchand | H04M 3/38 379/114.14 |
| 6,594,481 | B1 * | 7/2003 | Johnson | H04L 63/1416 455/410 |
| 6,856,982 | B1 * | 2/2005 | Stevens | H04L 63/1416 706/50 |
| 7,254,109 | B2 * | 8/2007 | Verma | H04L 41/0631 370/217 |
| 8,738,652 | B2 * | 5/2014 | Kramer | G06F 16/2465 707/776 |
| 9,191,422 | B2 * | 11/2015 | Tarbox | H04L 65/604 |
| 9,571,640 | B1 * | 2/2017 | Chen | H04M 1/663 |
| 10,091,349 | B1 * | 10/2018 | Rao | H04M 3/51 |
| 10,102,868 | B2 * | 10/2018 | Baracaldo Angel | G06N 20/00 |
| 10,484,532 | B1 * | 11/2019 | Newman | H04M 3/5183 |
| 10,616,411 | B1 * | 4/2020 | Chang | H04M 3/436 |
| 2002/0188712 | A1 * | 12/2002 | Caslin | G06Q 20/102 709/223 |
| 2003/0063725 | A1 * | 4/2003 | Marchand | H04M 15/00 379/114.14 |
| 2004/0203575 | A1 * | 10/2004 | Chin | H04W 4/90 455/404.1 |
| 2006/0013372 | A1 * | 1/2006 | Russell | H04M 15/06 379/114.14 |
| 2007/0030842 | A1 * | 2/2007 | Borden | G06K 9/6232 370/352 |
| 2007/0124246 | A1 * | 5/2007 | Lawyer | H04M 15/00 705/50 |
| 2008/0267375 | A1 * | 10/2008 | Betts | H04L 63/14 379/189 |
| 2011/0239295 | A1 * | 9/2011 | Sorge | H04L 63/1416 726/22 |
| 2012/0099711 | A1 * | 4/2012 | Tully | H04M 3/2281 379/32.01 |
| 2014/0206310 | A1 * | 7/2014 | Bluestein | H04L 67/22 455/405 |
| 2017/0134574 | A1 * | 5/2017 | Winkler | H04M 3/4211 |
| 2019/0215339 | A1 * | 7/2019 | Chen | H04L 63/20 |
| 2020/0128126 | A1 * | 4/2020 | Newman | H04W 12/12 |

* cited by examiner

SYSTEM AND METHOD DETECTING FRAUD USING MACHINE-LEARNING AND RECORDED VOICE CLIPS

RELATED APPLICATIONS

This application is a continuation of U.S. patent application Ser. No. 16/167,710, titled "SYSTEM AND METHOD DETECTING FRAUD USING MACHINE-LEARNING AND RECORDED VOICE CLIPS" filed on Oct. 23, 2018. The contents of the aforementioned application are incorporated herein by reference.

BACKGROUND

Payment Card Industry (PCI) standards govern the obligations of major credit card companies to protect customer information during payment card transactions. For example, PCI rules require companies to provide telephonic support to enable the customers to modify information such as correspondence addresses and phone numbers. Because accounts can be accessed once customer information is obtained, customer support call centers are frequent targets of fraudulent callers. In fact, up to 90% of the calls received on any given day at customer call centers are from fraudulent callers attempting to improperly gain access to customer accounts.

SUMMARY

According to one aspect of the invention, a system for detecting fraudulent calls received from an incoming call network by a call service center comprising a plurality of call handlers is described. The system includes a fraud training table comprising at least one fraud training entry, the fraud training entry storing information related to at least one characteristic of a fraudulent caller as indicated by a call handler, the characteristic selected from a group including audible characteristics and origin characteristics. The system further includes a machine-learning model coupled to receive training input from the fraud training table and a call center interface, coupled between the incoming call network and the call handler, to selectively route a call received from the incoming call network to the call handler in response to the machine-learning model.

According to another aspect of the invention, a method for detecting fraudulent calls received at a call service center includes the steps of receiving a call at the call service center and selectively forwarding the call to a call handler. The method further includes the steps of monitoring characteristics of the call to locate audible characteristics which are identified in a fraud training table and responsive to the location of an audible characteristic that is identified in the fraud training table, calculating a probability that the call is from a fraudulent caller.

According to a further aspect of the invention, a method for detecting fraudulent calls received at a call service center includes the steps of training a machine-learning model to recognize characteristics, including background noise characteristics, of fraudulent calls to provide a trained machine-learning model. The training may be performed using a fraud training table, wherein the fraud training table comprises a plurality of entries corresponding to a plurality of characteristics of fraudulent calls. The method includes the steps of receiving a call at the call service center and deploying a call agent to handle the call, the call agent comprising a copy of the trained machine-learning model. During the call, the call agent analyzes characteristics of the call to identify characteristics of the call that are associated with fraudulent calls and, in response to the step of analyzing, calculates a probability that the call is fraudulent. In response to the determination of the probability, the call is selectively routed to a call handler. The probability may be displayed at a graphical user interface (GUI) of the call handler. The method further includes the steps of determining, in response to at least one of a call handler input or the probability, that the call is from a fraudulent caller and diverting the call.

DETAILED DESCRIPTION

Figure 1:
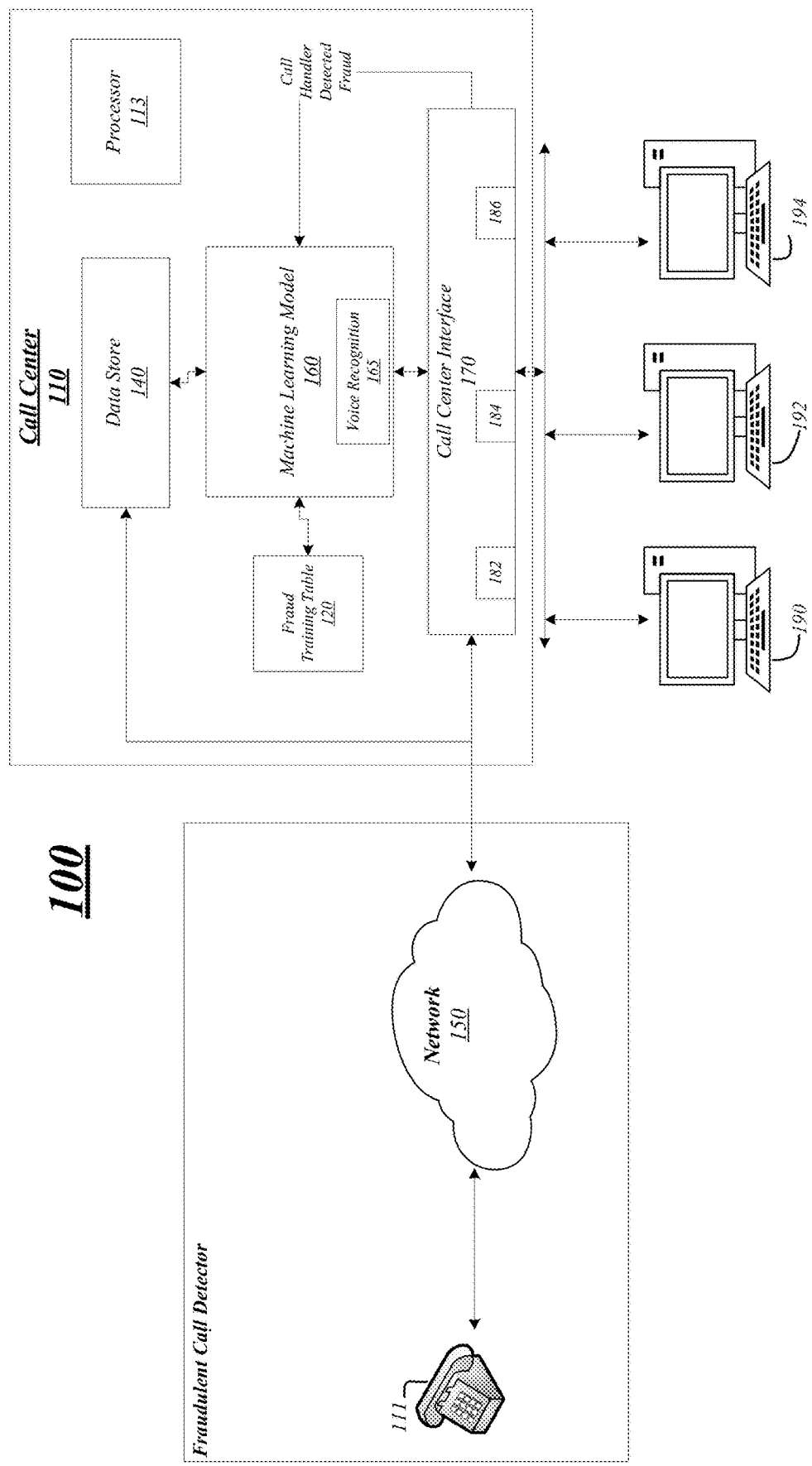
FIG. 1 is a block diagram of one embodiment of a system including a call center server for detecting fraudulent calls according to the present invention.

According to one aspect of the invention, it has been determined that fraudulent calls may share certain audible characteristics, such as background noise, speech patterns, select words and the like. To address this issue, a system and method of the present invention trains a machine-learning model to detect fraudulent calls. The machine-learning model is trained using audio clips, voice recognition, call handler feedback and general public knowledge of commercial risks to detect and divert fraudulent calls, thereby alleviating the burdens otherwise placed on call handlers.

In one embodiment a system for detecting fraudulent calls includes a machine-learning model adapted to receive information from call handlers regarding calls determined to be fraudulent. The machine-learning model parses audio of received calls using voice recognition techniques to extract characteristics of fraudulent calls. The extracted characteristics are used to train a call center interface to more rapidly detect and dispose of fraudulent calls. Advantageously a Graphic User Interface (GUI) of a call handler displays a probability that a received call is fraudulent, wherein the probability is determined in response to the trained machine-learning model.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

As used in this application, the terms "system" and "component" are intended to refer to a computer-related entity, either hardware, a combination of hardware and software, software, or software in execution, examples of which are provided by the exemplary computing architecture 100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 100.

FIG. 1 illustrates one embodiment of a call center server 110 which may be included in a computing architecture 100 of the present invention. The call center server 110 is adapted to route incoming calls received from one or more users such as user 111 over network 150 to call center service representatives ("call handlers" for short) at workstations 190, 192, 194 for customer service support. In embodiments the call center server 110 may be a processing system that includes one or more servers or computing devices that are interconnected via one or more network links, e.g., wired, wireless, fiber, etc. In some instances, the call center server may be a distributed computing system. Each of the servers may include one or more processor(s) 113 which may include one or more processing cores to process software instructions to control information and data.

Call center server 110 is shown to include several components particular to the invention, including fraud training table 120, machine-learning model 160, voice recognition system 165 and call center interface 170.

According to one aspect of the invention, a machine-learning model 160 estimates the validity of a caller in response to a training data set built using fraudulent call data (i.e., data obtained from a call later determined to be from a fraudulent caller). Machine-learning models can be constructed through an at least partially automated (e.g., with little or no human involvement) process called training. During training and operation of the model 160, input data can be iteratively supplied to a machine-learning model to enable the machine-learning model to identify patterns related to the input data or to identify relationships between the input data and output data. For example, in response to a "call hander detected fraud" received via the call center interface 110 from a call handler, the machine learning model can retrieve call audio from the data store. In the present invention the input data for the machine-learning model includes audio clips which may be processed using voice recognition system 165 to extract features of fraudulent calls. Voice recognition system 165 uses techniques known generally in the art to compare incoming audio data against an existing data set of audio data to determine probable audio matches. The machine-learning model analyzes the extracted features to identify patterns and characteristics of fraudulent calls and records the characteristics and patterns in fraud training table 120. With training, the machine-learning model can be transformed from an untrained state to a trained state and can thereby be used to detect fraudulent callers in real-time.

Thus, in one embodiment Fraud Training Table 120 stores a plurality of training entries, each entry associated with one or more fraudulent call characteristic(s). The machine-learning model 160 operates to continuously update the fraud training table 120 in response to ongoing fraudulent caller activity to ensure that trending fraudulent activity may be identified and appropriately diverted. As will be described in more detail below, as call handlers flag fraudulent calls, the calls are processed substantially in real time to extract fraudulent call characteristics to more quickly identify patterns of fraudulent activity and to diminish its impact.

Call center interface 170 operates to selectively route calls received from network 150 to one or more call handlers at workstations 190, 192 and 194. According to one aspect of the invention, when a call is received at the call center server 110, a call agent (such as agent 182, 184, 186) is generated to handle that call. The call agent, such as call agent 182, is a copy of the software code of the current trained machine-learning model 160. The call agent 182 monitors the incoming data stream of the call using the trained machine-learning model to detect fraudulent activity. Upon detection of fraudulent activity, the agent diverts the fraudulent call. For the purposes of this application, "diverting" a call may include forwarding the call to a particular individual or administrative branch for further handling, terminating the call or otherwise transferring the call away from customer service.

It should be noted that although FIG. 1 illustrates the call agents 182, 184, 186 as part of the call center interface 170, other embodiments are also envisioned wherein the call agent is deployed to and operates locally on the workstation 190 of the call handler. The decision as to where to deploy the call agent is largely a matter of design choice and will vary depending upon the factors such as the architecture of the call center, the geographic distribution of call handers and other like considerations. In addition, though the use of an agent is described herein, it is understood that similar functionality could be achieved via a shared service operating on a cloud computing network, and the present invention is not limited to the use of software agents as described herein.

In one embodiment, each call agent further includes functionality for maintaining a running Fraud Probability Factor (FPF) for its associated call. The FPF may be a numerical value representing the likelihood that the caller is fraudulent. The FPF value is preferably dynamically updated in substantially real-time as more information (including audible responses, background noise, location information, etc.) is received from or about the caller during a call. As will be described in more detail below, in one embodiment the FPF is displayed to the call handler, alerting the handler to the potential of fraud and enabling the call handler to appropriately divert the call. In other or concurrent embodiments, calls may be automatically diverted by the server 110 in response to the FPF meeting a predetermined threshold.

Call center server 110 is further shown to include data store 140. In some embodiments, the data store 140 is used to store audio call data. Data store 140 can include one or more memory (volatile or non-volatile) devices configured to store instructions used by the one or more processors 113 to perform one or more operations consistent with the disclosed embodiments. For example, data store 140 can be configured with one or more software instructions, such as programs that can perform one or more operations when executed by the one or more processors 113.

Figure 2:
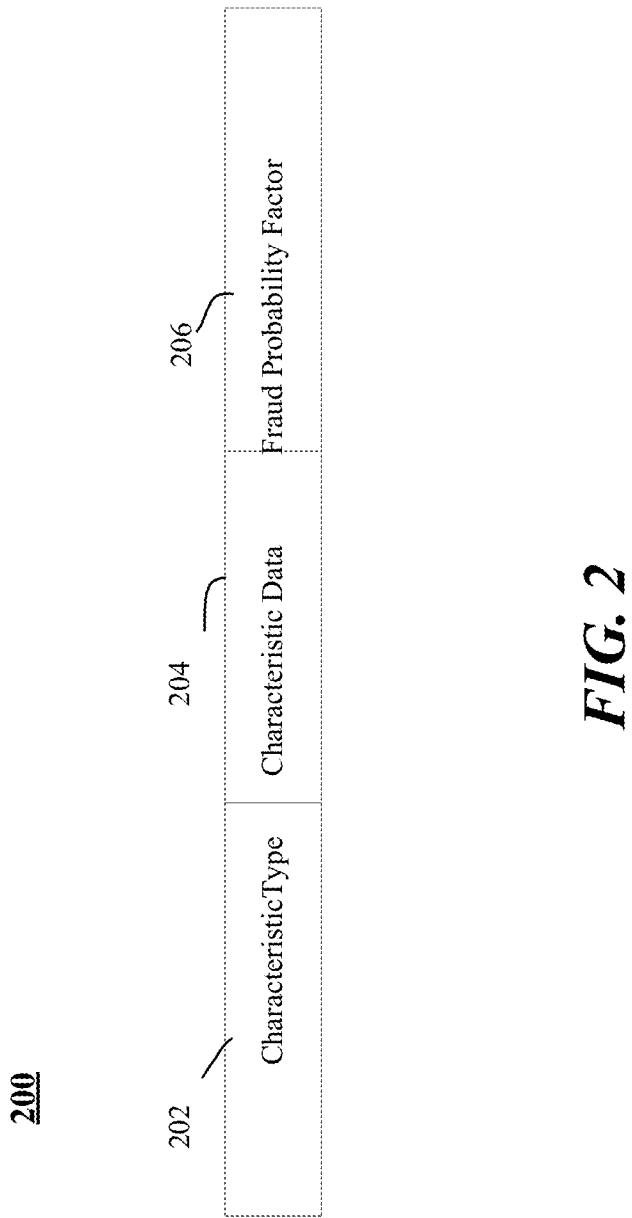
FIG. 2 illustrates exemplary fields that may be included in a fraud training table entry of the call center server of FIG. 1.

FIG. 2 illustrates one example of a fraud training table entry 200, including a characteristic type 202, a characteristic data 204 and a fraud factor 206. The characteristic type identifies the type of fraudulent call characteristic, for example, an audible characteristic, an origin characteristic, or other call attribute. Audible characteristic types may include, but not be limited to background noises, speech patterns, voices and accents. Examples of background noises that have been associated with fraudulent calls include background noises designed to increase the stress of the call handler, such as sirens, crying children, shouting, loud noises and the like. Origin characteristics may include, but are not limited to, area codes, country codes, phone numbers, and IP addresses.

The characteristic data field 204 stores the data associated with the characteristic type. For example, audible characteristic data may include an audio clip. Origin characteristic data may include the country code, area code or other data indicative of the call.

The Fraud Probability Factor (FPF) field 206 stores the FPF attributable to the respective characteristic of the fraud table entry. In one embodiment, the FPF may range between a value of 0-1, where zero represents a very low probability that the caller is fraudulent, and 1 representing a certainty that the caller is fraudulent. It should be noted that although a range of between 0 and 1 is described, any range of values or other means of quantifying risk may be substituted without affecting the scope of the invention.

In one embodiment, the FPF for each fraud table entry is calculated when the potentially fraudulent characteristic is first identified by the machine-learning model 160, and dynamically updated substantially in real-time to reflect the current correlation between the associated characteristic and fraudulent calls. For example, an incoming call having a loud background noise such as a siren may be parsed to extract the noise characteristic, which is initially assigned a certain FPF reflecting the uncertainty as to whether this sound can be relied upon as a determination that the call is from a fraudulent source. As more fraudulent calls are detected that are found to include the siren the FPF associated with the characteristic is increased.

Figure 3:
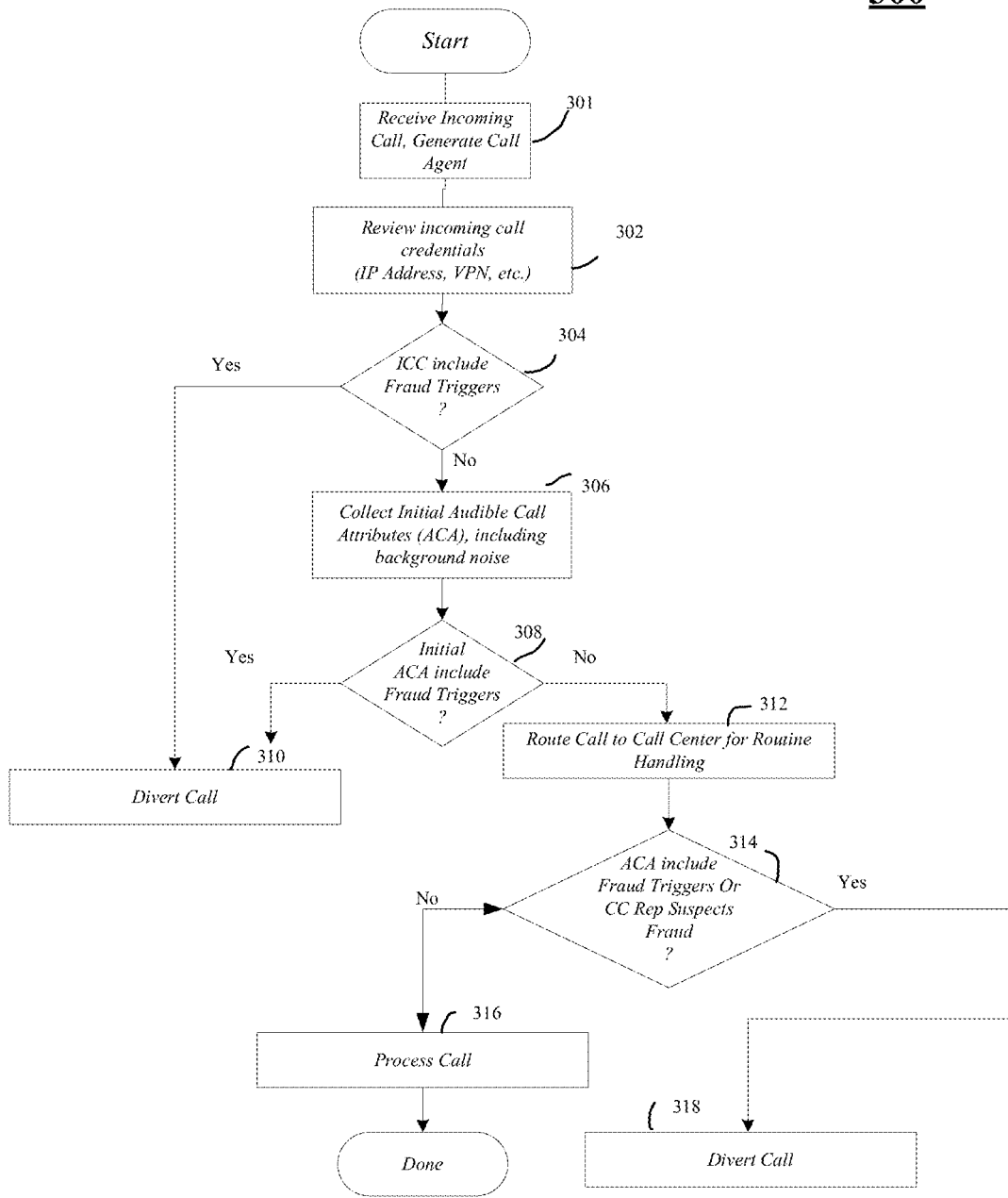
FIG. 3 is a flow diagram of exemplary steps that may be performed by an interface of the call center server of FIG. 1.

FIG. 3 is a flow diagram illustrating some exemplary steps that may be performed as part of a process for identifying and routing fraudulent calls by a call center server. Although the steps are described sequentially, it is appreciated that machine-learning models are capable of parallel processing and thus implementations are not restricted to any particular order of operations.

At step 301 a call is received at the call center server 110 and a call agent is deployed to handle the call, wherein the call agent comprises a current version of a trained machine-learning model 160. At step 302 the call agent compares incoming call credentials (phone number, IP address, etc.) against known fraudulent origin characteristics that suggest a fraudulent caller. If so, the call may be automatically diverted at step 310, precluding assignment to a call handler. If at step 304 no issue is detected with call origin, then at step 306 and 308 the call agent monitors the initial call audio using voice recognition and the trained machine-learning model for instances of fraudulent audible characteristics. Although initial audio screening is not required, such initial screening using the trained call agent allows fraudulent calls to be diverted without inconveniencing the call handler, thereby increasing the efficiency of the call center.

If a fraud is detected by call agent at step 308, the call may be diverted at step 310. If a fraud is not detected at step 308, then at step 312 the call is routed to a call handler. The call agent associated with the call continues to monitor the call while the call handler processes the call at steps 314 and 316 unless and until the call is determined to be fraudulent, at which point it is diverted at step 318, or until the call is completed.

As described above in FIG. 2, in one embodiment each call agent maintains a running Fraud Probability Factor (FPF) that represents a likelihood that the call is fraudulent. The FPF may be generated in any variety of manners, including by combining FPFs for the detected call characteristics. In some embodiments the FPFs may be weighted based on 1). a correlation of the characteristic to a fraudulent call, 2). a recency of occurrence of the call characteristic or 3). other factors associated with the relevance of the call characteristic. In any event, one aspect of the invention includes displaying the FPF factor to the call handler to enable the call handler to make independent dispatch decisions in response to the teachings of the machine-learning model.

Figure 4:
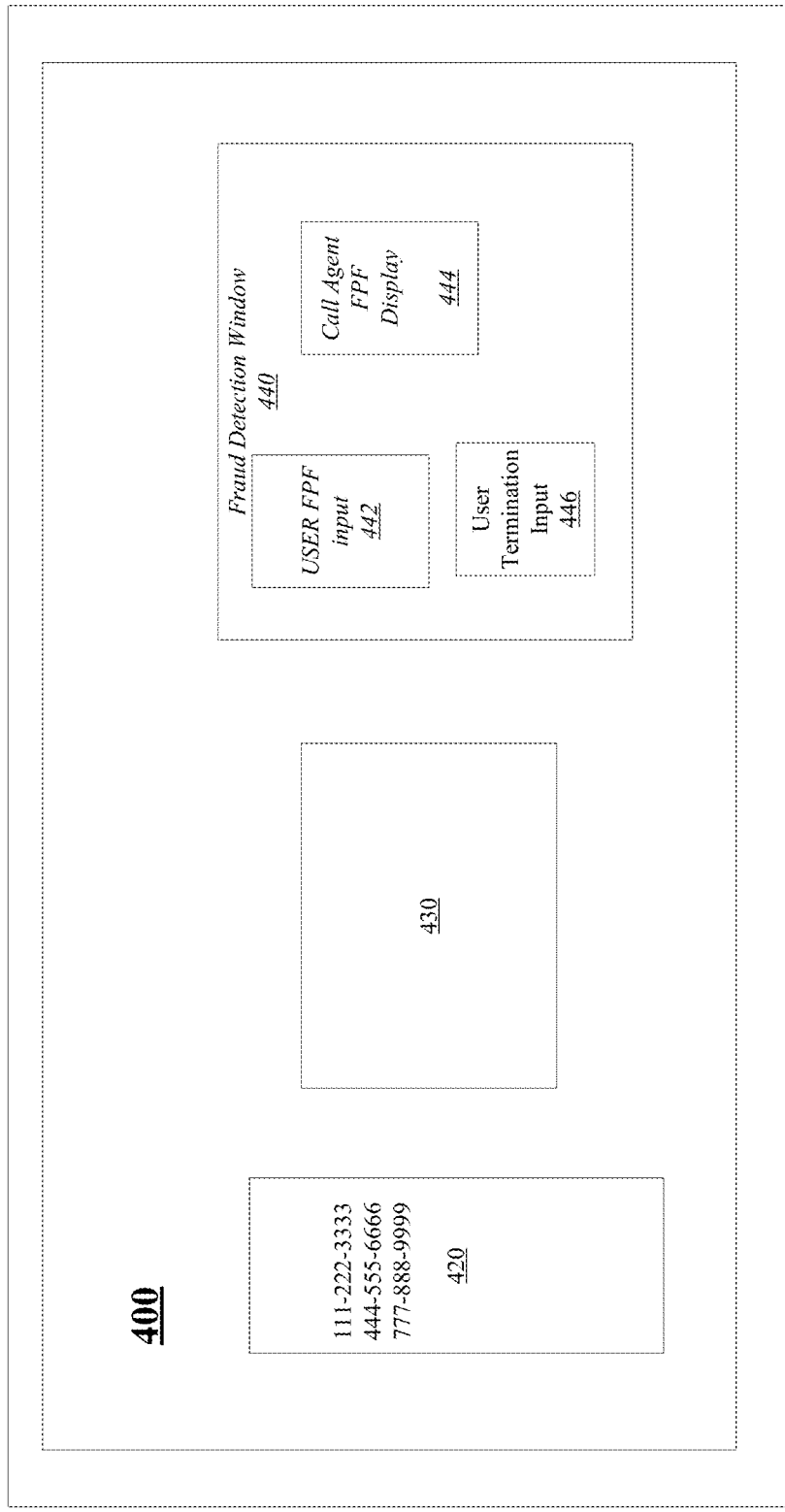
FIG. 4 is a representation of a Graphical User Interface which may be provided at a workstation of a call handler utilizing the present invention.

FIG. 4 is an exemplary display 400 of a workstation of a call hander communicating with the call center server 110 of the present invention. The display 400 is shown to include a call window 420, a call workflow window 430 and a fraud detection window 440. The call window 420 is shown to include a list of pending calls to be serviced by the call handler. The workflow window 430 may include an interface that permits the call handler to access a callers account or perform other customer support functions for the caller. The fraud detection window 440 includes one or more display elements 444 that displays the FPF from the perspective of the call agent. The fraud detection window may also advantageously include one or more input elements (442, 446), operable to accept input from the call handler regarding the call handlers' perception that the call is fraudulent.

Figure 5:
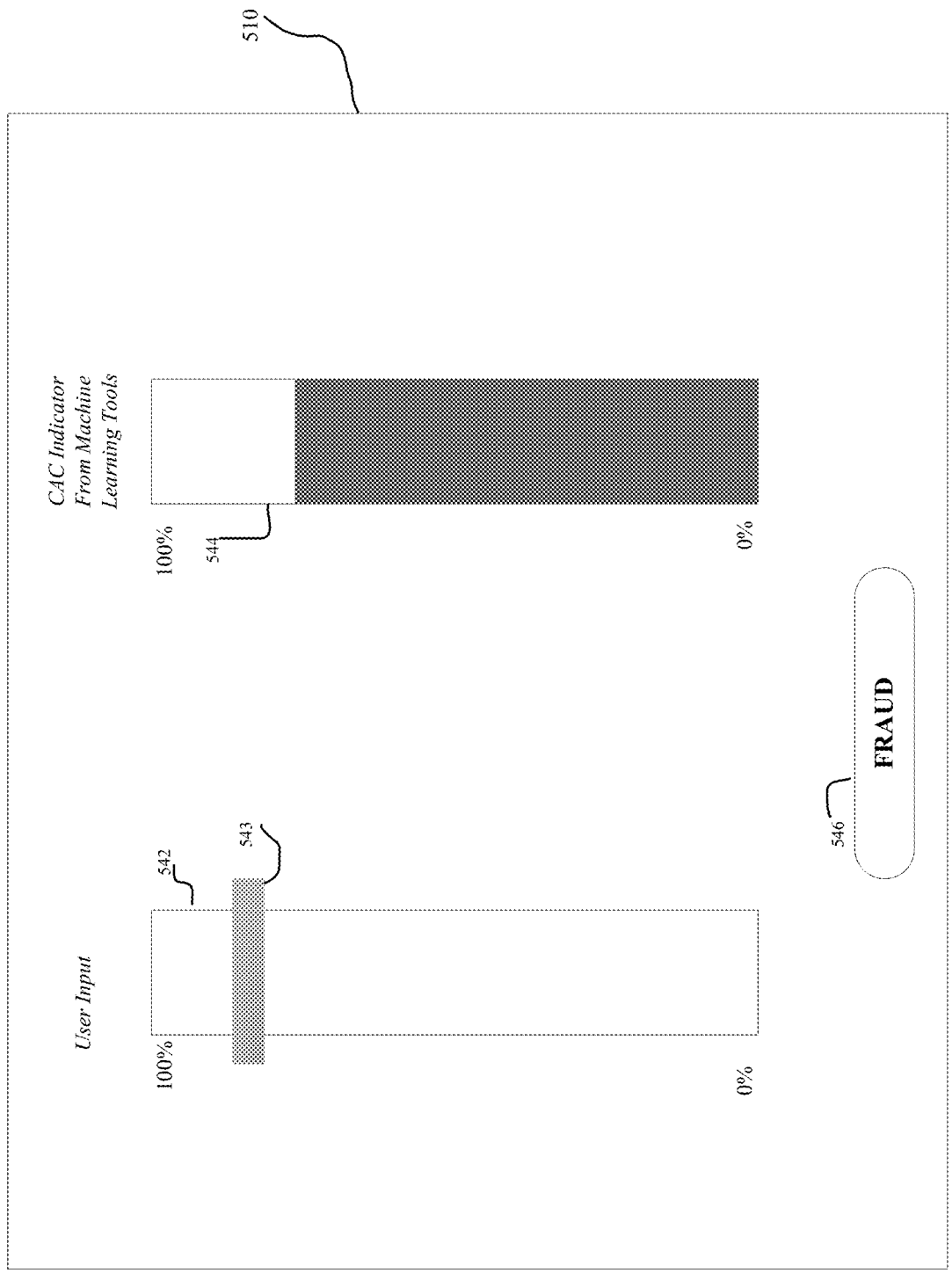
FIG. 5 is an illustrative example of control features that may be provided to a call handler as part of the GUI of FIG. 4.

For example, FIG. 5 illustrates display and control elements that may be included in a fraud detection window 510 provided according to the principals of the invention. A watermark display 544 may be used to display the current FPF of the call. The watermark may indicate by virtue of depth, color, or a combination thereof, the risk associated with the call. Other methods of providing cues to the call hander about the fraudulent potential to the call may be substituted herein without diverging from the scope of the invention. Such indications include but are not limited to visual cues such as a colored border around some portion of the display, a flashing element of the display and the appearance of icons or text messages to the call handler.

Indications may also include audible indications, either alone or accompanying the visual cues.

The fraud detection window 510 may also include mechanisms that permit the call handler to reflect their own perception as to the fraudulent nature of a call. For example, the fraud detection window may include a sliding ruler element 542, with a slide-able bar 543 that can be moved by the call handler in accordance with their impressions of the caller. In some embodiments, the slide-able bar may move in accordance with the watermark of 544. In other embodiments, the slide-able bar may be wholly controlled by the call handler. Other mechanisms that permit a call handler to input their impressions of the caller, including checklists and the like. In still other embodiments, the input mechanism may include a communication medium enabling the call handler to report troubling aspects of the call, such as strange noises, accents, speech patterns and the like. The reported information may be later input into the machine-learning model to further train call agents.

In addition, the fraud detection window may include an input element such as Fraud button 546 that permits the call handler to immediately terminate the call. Should the Fraud button 546 be activated, the call is flagged as fraudulent and data associated with the call can be used to further train the machine-learning model.

Figure 6:
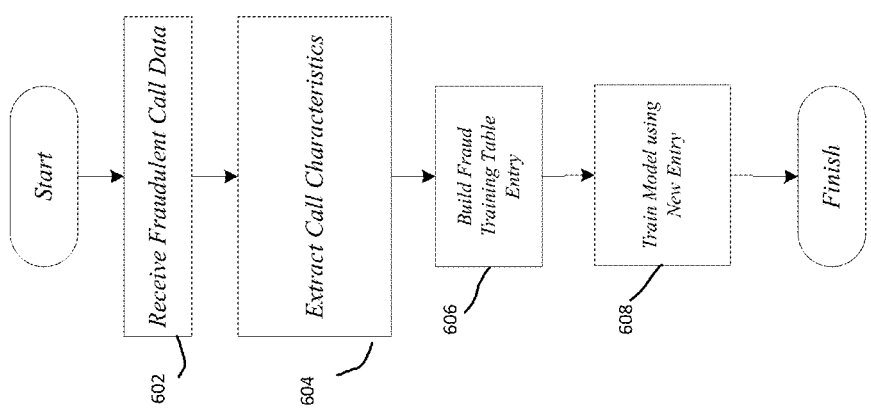
FIG. 6 is a flow diagram of exemplary steps performed by a machine-learning model adapted to detect fraudulent calls according to the principles of the present invention.

One feature of the invention is the use of a trained machine-learning model capable of detecting and diverting fraudulent calls in substantially real-time. FIG. 6 is a flow chart of an example of a process for generating and using a machine-learning model according to some aspects. Machine-learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

As described previously, machine-learning models can be constructed through an at least partially automated (e.g., with little or no human involvement) process called training. A machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model must find structure in the inputs on its own. In semi-supervised training, only some of the inputs in the training data are correlated to desired outputs.

In one embodiment, the machine-learning model of the present invention is initially trained using a data set of known characteristics of a fraudulent call. Such known characteristics include, for example, calls originating from countries known to frequently source fraudulent calls. In other embodiments, the machine-learning model of the present invention is self-taught in response to detection of fraudulent calls by the call handlers.

FIG. 6 is a flow diagram illustrating exemplary steps that may be performed during a process 600 training of the machine-learning model of the invention. At step 602 the model obtains notice that a fraudulent call has been received by the call center. At step 604 call data is retrieved from data store 140 and processed by voice recognition software 165 to extract call features. Machine-learning model 160 analyzes the features to detect characteristics and patterns that may be associated with fraudulent calls. At step 606, the machine-learning model constructs a fraud training table entry and updates the fraud training table. At step 608, the machine-learning model is trained using the new entry. The process 600 is repeated for each identified fraudulent call, thus maintaining currency of the machine-learning model and ensuring that deployed call agents are able to divert calls in accordance with trending fraudulent call behavior.

Accordingly, a system and method has been shown and described that improves the efficiency and security of call centers by reducing the time required by call handlers in servicing fraudulent callers. Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of functional blocks or units that might be implemented as program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but still co-operate or interact with each other.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, various features are grouped together in a single embodiment to streamline the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A system for detecting fraudulent calls received from an incoming call network by a call service center comprising a plurality of call handlers comprises:
   a processor;
   a fraud training table comprising a fraud training entry storing information related to at least one characteristic of a fraudulent caller as indicated by a call handler, the at least one characteristic including an audible characteristic;
   a machine-learning model coupled to the fraud training table for training the machine-learning model to recognize audible characteristics; and
   a call center interface, coupled between the incoming call network and the call handler, the call center interface including program code operable when executed upon by the processor to:
   detect a call comprising an incoming call data stream;
   generate a software agent to monitor the incoming call data stream;
   apply, by the software agent, the machine-learning model to the incoming call data stream to identify audible call characteristics and to determine, based on the audible call characteristics, a fraud probability factor; and
   display the fraud probability factor on a display of the call center interface.

2. The system of claim 1, wherein the call center interface further comprises a mechanism for diverting the call when the fraud probability factor indicates a likelihood that the call is fraudulent.

3. The system of claim 2, wherein the mechanism includes program code that automatically diverts the call when the fraud probability factor exceeds a predetermined threshold.

4. The system of claim 3, wherein the mechanism includes an input element, provided on a user interface of the system, that enables manual diversion of the call based on the fraud probability factor.

5. The system of claim 1, wherein the call center interface further includes an input element enabling a call center agent to modify the fraud probability factor, the input element including a watermark indicator, a checklist or a combination thereof.

6. The system of claim 3, wherein the incoming call data stream is used to update the fraud training table in response to diversion of the call.

7. The system of claim 1, wherein the fraud probability factor is dynamically updated in response to the incoming call data stream.

8. The system of claim 7, wherein the fraud probability factor is manually updated in response to the incoming call data stream.

9. The system of claim 1, wherein the call center interface is coupled to a voice recognition system configured to extract the audible call characteristics from the incoming call data stream.

10. The system of claim 1, wherein the audible characteristic includes background noise, speech patterns, voices, accents or a combination thereof.

11. A method for detecting fraudulent calls received at a call service center comprises:
- training a machine-learning model to recognize characteristics, including audible characteristics, of fraudulent calls to provide a trained machine-learning model, the training performed using a fraud training table, wherein the fraud training table comprises a plurality of entries corresponding to a plurality of characteristics of fraudulent calls;
- receiving a call comprising an incoming call data stream at the call service center;
- deploying a software call agent to handle the call, the software call agent comprising a copy of the trained machine-learning model;
- during the call, the software call agent analyzing characteristics of the call to identify characteristics of the call that are associated with fraudulent calls utilizing the trained machine-learning model;
- calculating a fraud probability factor that the call is fraudulent in response to the analysis;
- displaying the fraud probability factor on a display of the call service center; and
- diverting the call based on the fraud probability factor.

12. The method of claim 11, wherein the diverting occurs automatically when the fraud probability factor exceeds a predetermined threshold.

13. The method of claim 11, wherein the diverting occurs in response to manual input at a user interface of call service center.

14. The method of claim 11, including the step of updating the fraud probability factor in response to user input at a user interface of the call service center, the user interface including a watermark indicator, a checklist or a combination thereof related to the call.

15. The method of claim 11, further comprising updating the fraud training table in response to diversion of the call.

16. The method of claim 11, wherein the fraud probability factor is dynamically updated in response to the incoming call data stream.

17. The method of claim 16, wherein the fraud probability factor is manually updated in response to the incoming call data stream.

18. The method of claim 11, wherein the audible characteristics of fraudulent calls include background noise, speech patterns, voices, accents or a combination thereof.

19. The method of claim 11, wherein the step of analyzing characteristics of the call uses a voice recognition system.

20. A method for identifying fraudulent calls received at a call service center includes the steps of:
- training a machine-learning model to recognize characteristics, including audible characteristics, of fraudulent calls to provide a trained machine-learning model, the training performed using a fraud training table, wherein the fraud training table comprises a plurality of entries corresponding to a plurality of characteristics of fraudulent calls;
- receiving a call at the call service center;
- deploying a software call agent to handle the call, the software call agent comprising a copy of the trained machine-learning model;
- during the call, calculating a fraud probability factor that the call is fraudulent using the trained machine-learning model;
- displaying the fraud probability factor on a display interface of the call service center, the display interface including an input element enabling a call center agent to modify the fraud probability factor during the call; and
- diverting the call based on the fraud probability factor.

* * * * *